US008656438B2

(12) United States Patent
Kahn et al.

(10) Patent No.: US 8,656,438 B2
(45) Date of Patent: Feb. 18, 2014

(54) METHOD AND SYSTEM OF QUEUED MANAGEMENT OF MULTIMEDIA STORAGE

(75) Inventors: Brian E. Kahn, Arlington, MA (US); Timothy J. Ewald, Nashua, NH (US)

(73) Assignee: SeaChange International, Inc., Acton, MA (US)

( * ) Notice: Subject to any disclaimer, the term of this patent is extended or adjusted under 35 U.S.C. 154(b) by 0 days.

(21) Appl. No.: 13/107,415

(22) Filed: May 13, 2011

(65) Prior Publication Data

US 2011/0219410 A1    Sep. 8, 2011

Related U.S. Application Data

(62) Division of application No. 12/054,783, filed on Mar. 25, 2008, now Pat. No. 7,971,223.

(51) Int. Cl.
*H04N 7/173* (2011.01)
*H04N 5/445* (2011.01)

(52) U.S. Cl.
USPC ............. 725/93; 725/61; 725/92; 725/115

(58) Field of Classification Search
USPC .............................................. 725/58, 92, 115
See application file for complete search history.

(56) References Cited

U.S. PATENT DOCUMENTS

| | | | |
|---|---|---|---|
| 5,093,718 A | 3/1992 | Hoarty et al. | 358/84 |
| 5,099,319 A | 3/1992 | Esch et al. | 358/86 |
| 5,220,420 A | 6/1993 | Hoarty et al. | 358/86 |
| 5,319,455 A | 6/1994 | Hoarty et al. | 348/7 |
| 5,341,474 A | 8/1994 | Gelman et al. | 725/94 |
| 5,361,091 A | 11/1994 | Hoarty et al. | 348/7 |
| 6,005,561 A | 12/1999 | Hawkins et al. | 345/327 |
| 6,223,211 B1 | 4/2001 | Hamilton et al. | 709/203 |
| 6,754,904 B1 | 6/2004 | Cooper et al. | 725/32 |
| 6,774,926 B1 | 8/2004 | Ellis et al. | 348/14.01 |
| 6,986,153 B1 | 1/2006 | Ridderheim et al. | 725/32 |
| 7,068,724 B1 | 6/2006 | Hamilton | 375/240.26 |
| 7,086,079 B1 | 8/2006 | Kunin et al. | 725/131 |
| 7,096,484 B2 | 8/2006 | Mao et al. | 725/52 |
| 7,103,905 B2 | 9/2006 | Novak | 725/46 |
| 7,769,829 B1 | 8/2010 | Riggs et al. | 709/219 |
| 2003/0192054 A1* | 10/2003 | Birks et al. | 725/100 |
| 2004/0162787 A1 | 8/2004 | Madison et al. | 705/64 |
| 2004/0175097 A1 | 9/2004 | Caspi et al. | 386/46 |
| 2005/0149987 A1 | 7/2005 | Boccon-Gibod et al. | 725/135 |

(Continued)

FOREIGN PATENT DOCUMENTS

JP    2001 148841    5/2001

*Primary Examiner* — Chris Parry
(74) *Attorney, Agent, or Firm* — Proskauer Rose LLP

(57) ABSTRACT

A queue management module receives a message to queue location information for multimedia content. The queue management module stores the location information in a queue corresponding to a subscriber. The queue management module receives a message for location information from a video distribution module. The queue management module transmits a message for retrieval of multimedia content to the video distribution module. In other examples, a queue agent module transmits a message for location information for multimedia content to a queue management module. The queue agent module receives a message for retrieval of content from the queue management module. The queue agent module retrieves the multimedia content from the remote content server using the location information received in the message for retrieval of content. A data storage module identifies available storage in limited storage provided for the subscriber and stores the retrieved multimedia content in the limited storage for the subscriber.

10 Claims, 13 Drawing Sheets

(56) References Cited

U.S. PATENT DOCUMENTS

| | | | |
|---|---|---|---|
| 2005/0177853 A1 | 8/2005 | Williams et al. | 725/81 |
| 2005/0210521 A1* | 9/2005 | Compton | 725/91 |
| 2005/0289627 A1 | 12/2005 | Lohman | 725/109 |
| 2006/0146788 A1 | 7/2006 | Brown et al. | 370/352 |
| 2006/0190320 A1 | 8/2006 | Dewa | 705/14 |
| 2006/0230422 A1 | 10/2006 | Kunin et al. | 725/106 |
| 2008/0178239 A1 | 7/2008 | Yampanis | 725/110 |
| 2009/0158326 A1 | 6/2009 | Hunt | 725/38 |

* cited by examiner

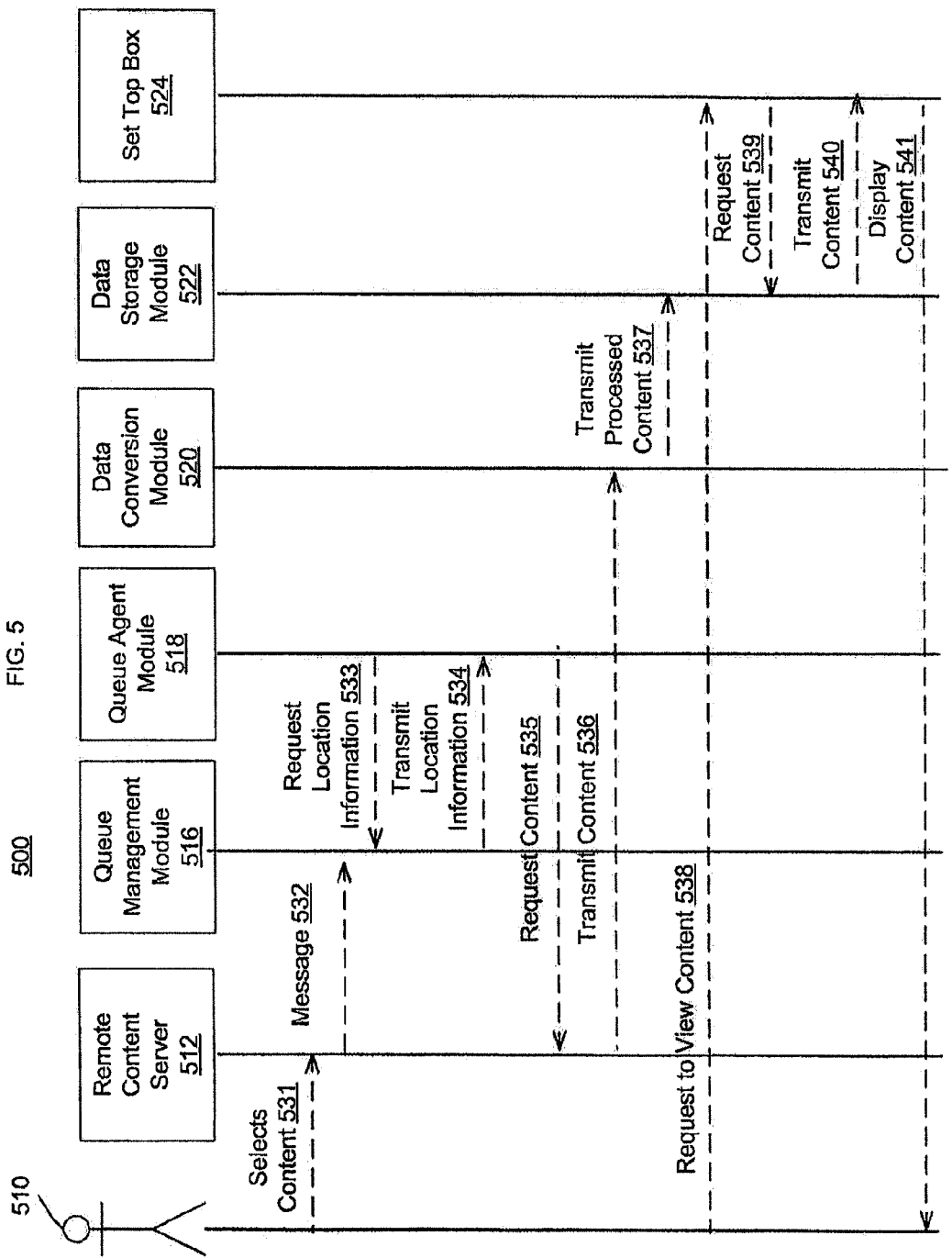

600a

| Queue | Name | Address | ProgramID |
|---|---|---|---|
| 1 | The State of Snowboarding | http://snow.ww.123 | FTD-2332352A |
| 2 | Come Out and Play | HomeVideoWWW-6353 | GWC-3262B |
| 3 | Find Your Dream Home | HomeVideoWWW-6311 | JA-3963 |
| 4 | Referee Pleads Guilty | LocalTV-323 | MS-06162006:23 |
| 5 | Superbad Review | NetworkTV-23 | PTDS-56A |
| 6 | Pasta with Shrimp Ragu | NetworkTV-63 | LNCS-235 |

| Queue | Name | Address | ProgramID |
|---|---|---|---|
| 1 | Come Out and Play | HomeVideoWWW-6353 | GWC-3262B |
| 2 | Find Your Dream Home | HomeVideoWWW-6311 | JA-3963 |
| 3 | Referee Pleads Guilty | LocalTV-323 | MS-06162006:23 |
| 4 | Superbad Review | NetworkTV-23 | PTDS-56A |

| CommunityID | Preference |
|---|---|
| Soap Operas | Auto Queue First |
| Drama Movies | Confirm |
| Comedy Troopers | Auto Queue Last |
| Sad Stories | Auto Queue Last |

| FriendID | Preference |
|---|---|
| George1234 | Auto Queue Last |
| Allen4823 | Confirm |
| Henry 323 | Delete |

FIG. 9

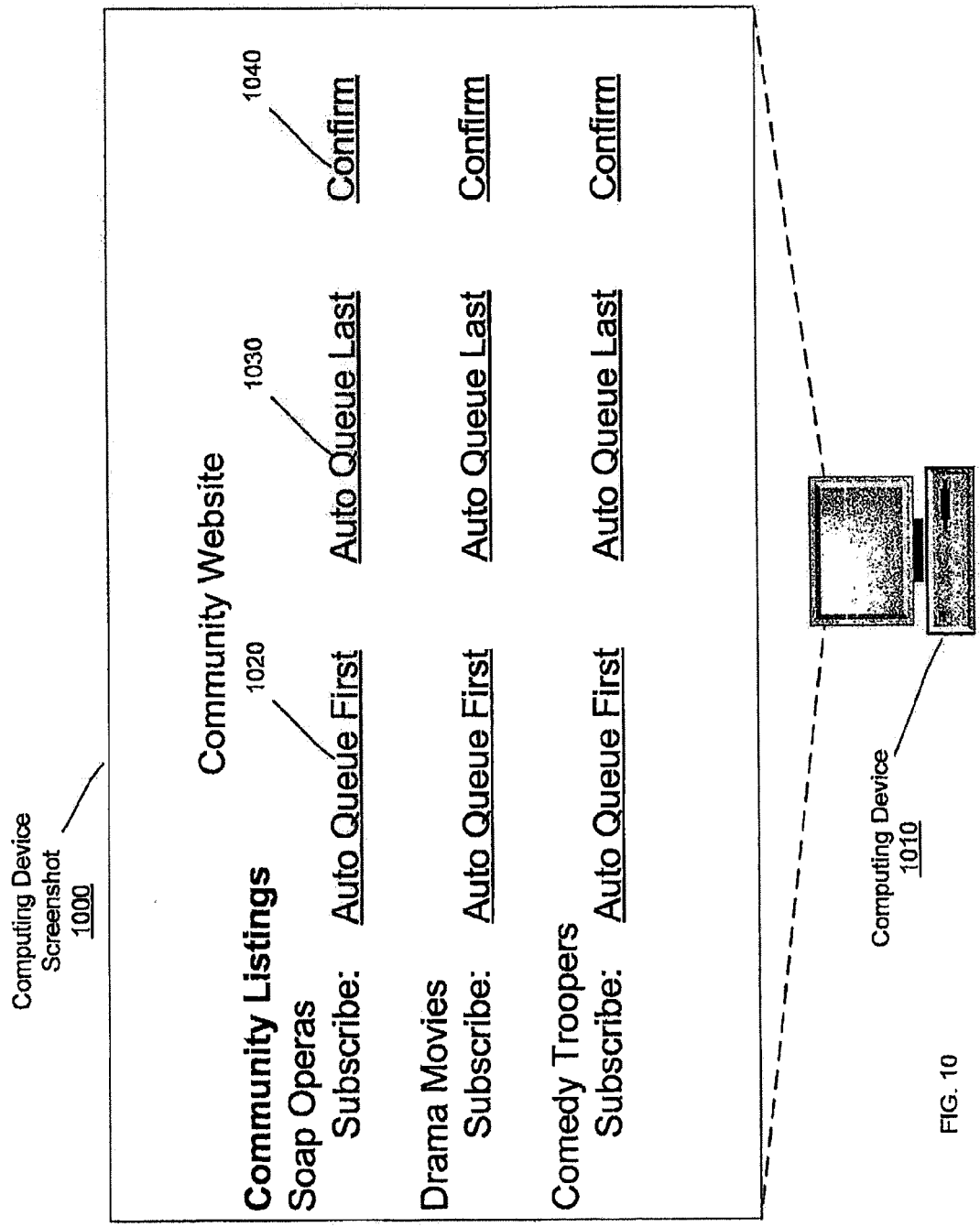

METHOD AND SYSTEM OF QUEUED MANAGEMENT OF MULTIMEDIA STORAGE

RELATED APPLICATIONS

This application is a divisional of U.S. patent application Ser. No. 12/054,783, filed on Mar. 25, 2008, the entire teachings of which are incorporated herein by reference.

FIELD OF THE INVENTION

The present invention relates generally to computer-based methods and apparatuses, including computer program products, for a method and system of queued management of multimedia storage.

BACKGROUND

Video content has generally been distributed to consumers via television networks (e.g., cable, fiber, telephone, etc.). The video content has generally been distributed via a broadcast method where all of the consumers connected to the television network receive the same video content at the same time via the same channels. Some television networks also have included video on demand (VOD) services. The VOD services allow a consumer to select specific video content for viewing via a channel for that consumer. However, the library of video content in a VOD service is generally limited to the video content that the television network provider decides to store on its VOD servers. Generally, the television network provider stores a limited amount of video content that is selected based on consumer demand.

SUMMARY OF THE INVENTION

A system and method are disclosed for queued management of multimedia storage. According to one aspect a method is provided. The method includes receiving a message to queue location information for multimedia content selected or subscribed to at a remote content server. The method further includes storing the location information in a queue corresponding to a subscriber of a video distribution module. The video distribution module provides the subscriber with limited storage for personalized multimedia content. The method further includes receiving a message for location information from the video distribution module and transmitting a message for retrieval of multimedia content to the video distribution module. The message for retrieval of multimedia content directs the retrieval of multimedia content from location information next in the queue for storage in the limited storage provided for the subscriber.

According to another aspect a method is provided. The method includes identifying available storage in limited storage provided for a subscriber. The method further includes transmitting a message, to a queue management module, for location information for multimedia content selected or subscribed to at a remote content server by the subscriber. The queue management module maintains a plurality of queues for individual subscribers of a video distribution module and each queue includes location information for a plurality of multimedia content. The method further includes receiving a message, from the queue management module, for retrieval of content. The message for retrieval of content includes the location information next in the queue associated with the subscriber. The method further includes retrieving the multimedia content from the remote content server using the location information received in the message for retrieval of content and storing the retrieved multimedia content in the limited storage provided for the subscriber.

According to another aspect a system is provided. The system includes a queue management module. The queue management module is programmed to receive a message to queue location information for multimedia content selected or subscribed to at a remote content server. The queue management module is further programmed to store the location information in a queue corresponding to a subscriber of a remote video distribution module. The remote video distribution module provides the subscriber with limited storage for personalized multimedia content. The queue management module is further programmed to receive a message for content from the video distribution module and transmit a message for retrieval of content to the video distribution module. The message for retrieval of content directs retrieval of multimedia content from location information next in the queue for storage in the limited storage provided for the subscriber.

According to another aspect a system is provided. The system includes a queue agent module and a data storage module. The queue agent module is programmed to transmit a message, to a queue management module, for location information for multimedia content selected or subscribed to at a remote content server by a subscriber. The queue management module maintains a plurality of queues for individual subscribers of a video distribution module and each queue includes location information for a plurality of multimedia content. The queue management module is further programmed to receive a message, from the queue management module, for retrieval of content. The message for retrieval of content includes the location information next in the queue associated with the subscriber. The queue management module is further programmed to retrieve the multimedia content from the remote content server using the location information received in the message for retrieval of content. The data storage module is programmed to identify available storage in limited storage provided for a subscriber and store the retrieved multimedia content in the limited storage provided for the subscriber.

According to another aspect a system is provided. The system includes a means for receiving a message to queue location information for multimedia content selected or subscribed to at a means for remote content. The system further includes a means for storing the location information in a queue corresponding to a subscriber of a means for remote video distribution. The means for remote video distribution provides the subscriber with limited storage for personalized multimedia content. The system further includes a means for receiving a message for content from the means for video distribution and a means for transmitting a message for retrieval of content to the means for video distribution directing retrieval of multimedia content from location information next in the queue for storage in the limited storage provided for the subscriber.

According to another aspect a system is provided. The system includes a means for transmitting a message, to a means for queue management, for location information for multimedia content selected or subscribed to at a means for remote content by a subscriber. The means for queue management maintains a plurality of queues for individual subscribers of a video distribution module and each queue includes location information for a plurality of multimedia content. The system further includes a means for receiving a message, from the means for queue management, for retrieval of content. The message for retrieval of content includes the location information next in the queue associated with the subscriber. The system further includes a means for retrieving the multimedia content from the means for remote content using the location information received in the message for retrieval of content. The system further includes a means for identifying available storage in limited storage provided for a subscriber and storing the retrieved multimedia content in the limited storage provided for the subscriber.

In other embodiments, any of the aspects above can include one or more of the following features. The queue includes the location information for more multimedia content than the video distribution module can retrieve and store in the limited storage provided for the subscriber. The queue includes a plurality of queue entries in a first order and each queue entry includes location information for multimedia content.

In some embodiments, a message to modify an order of the plurality of queue entries in the queue is received. The order of the plurality of queue entries is modified based on the message to modify the order. Each of the queue entries includes user identification information, queue order information, content location information, content identification information, content expiration information, community information, friend information, and/or list information.

In other embodiments, the location information is stored in at least one queue selected from a group of queues. The group of queues is associated with each other as a friend association, a community association, and/or a list association.

In some embodiments, the availability of multimedia content is determined from the remote content server based on a subscription to the multimedia content. Location information for the available multimedia content is stored in the queue.

In other embodiments, an authentication token is received from the remote content server. The authentication token is utilized to retrieve the multimedia content from the location information. The authentication token is stored in the queue. The authentication token is transmitted to the video distribution module which enables the authentication of the video distribution module with a remote content server associated with the location information.

In some embodiments, the stored multimedia content is transmitted to a viewing device associated with the subscriber. The multimedia content is displayed on the viewing device.

In other embodiments, an authentication token is received from the queue management module. The authentication token is associated with the multimedia content. The authentication token is transmitted to the remote content server to enable the retrieval of the multimedia content.

In some embodiments, the remote content server is different from the queue management module and the queue management module is different from the queue agent module.

In other embodiments, a data conversion module is programmed to receive the multimedia content from the remote content server, transcode the multimedia content into a format for displaying on a viewing device and generate one or more trick files based on the multimedia content.

In some embodiments, a viewing device programmed to receive the multimedia content from the data storage module and display the multimedia content. The viewing device includes a media computer, a computing device, a set top box, and/or a television.

Any of the aspects and/or embodiments described herein can provide one or more of the following advantages. An advantage is that subscribers can select more content than can be stored in the subscriber's limited storage which enables the subscribers to select the content at one time and view the content at a different time. Another advantage is that the system only has limited storage for each subscriber which decreases the storage demands while increasing the efficiency of the system by providing the subscriber with the content he/she selects. An additional advantage is that the subscribers can select content from any remote content server and view the content on their viewing device which enables the subscriber to select the available content and not the cable provider.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 5 is another exemplary flowchart depicting processing of multimedia content.

FIGS. 6A and 6B are exemplary queues depicting processing of multimedia content.

FIG. 8 is an exemplary table depicting community preferences.

FIG. 9 is an exemplary table depicting friend preferences.

FIG. 10 is an exemplary screenshot of a user interface.

DETAILED DESCRIPTION OF A PREFERRED EMBODIMENT

Figure 1:
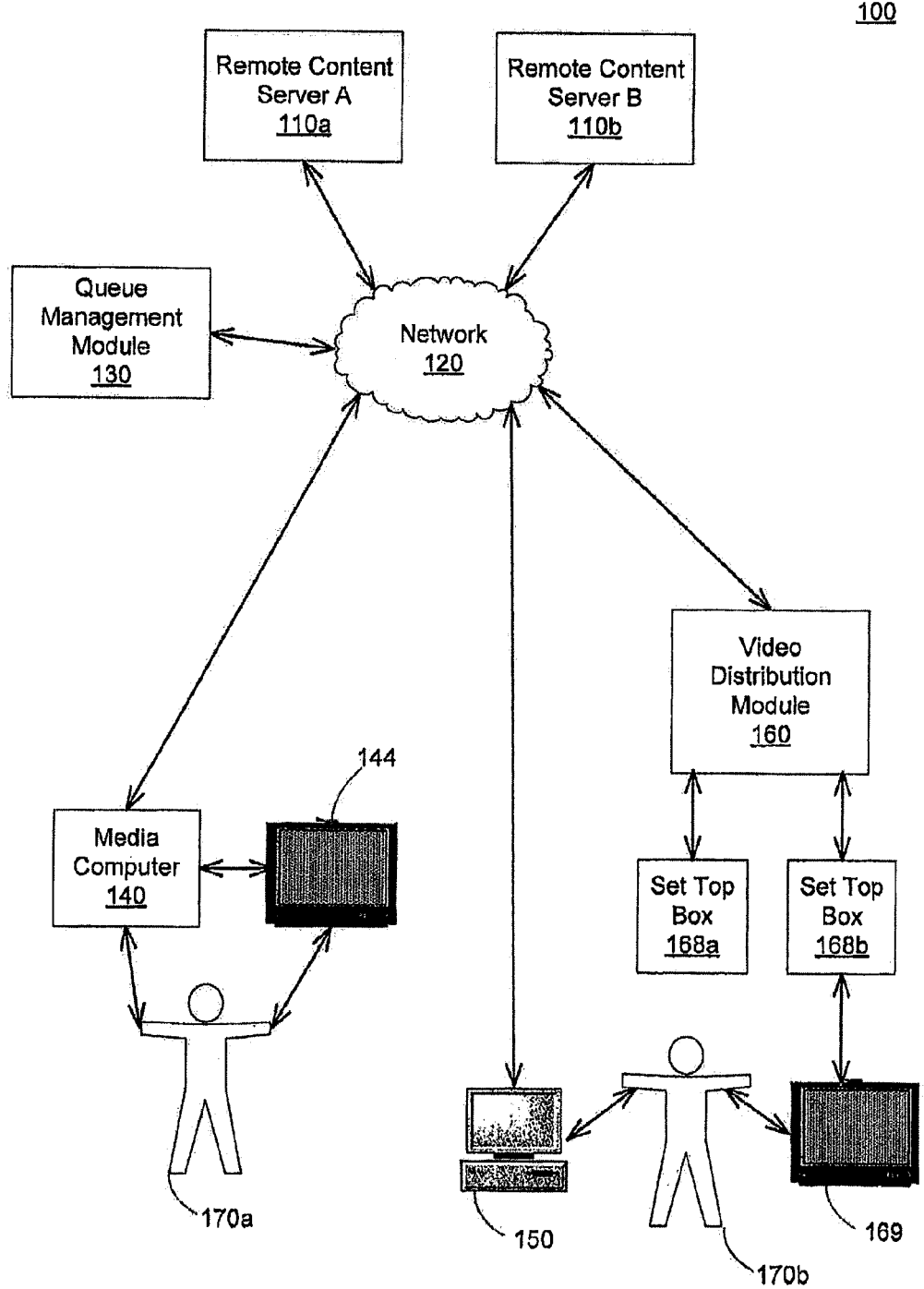
FIG. 1 is a functional block diagram of a system illustrating storage management of multimedia content according to one embodiment.

A method and system of queued management of multimedia content is disclosed. For illustration purposes, examples are provided. For example, a user utilizes a web browser on a personal computer to view the video on demand (VOD) queue management web site. The user subscribes to the VOD queue management service by entering the user's name, email address, street address, and television network provider. The VOD queue management service enables the subscriber (in this example, the user becomes a subscriber after subscribing to the service) to select content (e.g., movies, television shows, web broadcasts) for future viewing. The content is not stored by the VOD queue management service, but only source information for the selected content is stored by the VOD queue management service. The management of the queue by the VOD queue management service advantageously allows the subscriber to select all of the content that the subscriber wants to watch in the future without the subscriber worrying about storage restrictions which could prevent the content from being stored for viewing.

As a further example, the subscriber utilizes the web browser on the personal computer to view the television show catalogue on a television network's web site. The subscriber finds the television show, entitled "How Bow Wow Dog," that looks interesting and clicks on a hyperlink on the web page to select the television show for future viewing on the subscriber's television. The television network's web server directs the subscriber's web browser to the VOD queue management service's web site and transmits a request message with the uniform resource locator (URL) for the selected television show. Utilizing the web browser, the subscriber logs into the VOD queue management service's web site so that the VOD queue management service can associate the request message with the subscriber. After the user logs into the service's web site, the VOD queue management service finds the subscriber's queue of selected content (in this example, four television shows and one movie) and adds the new television show to the queue (in this example, the last entry in the queue is the television show entitled "How Bow Wow Dog" and the URL for the television show). The subscriber can then continue viewing the television network's web site and/or any other web site on the internet via the web browser on the personal computer.

As a further example, the subscriber has a television at home with a set top box connected to the television. The set top box communicates with a cable network headend on a cable television (CATV) network. After the subscriber watches a television show, the subscriber deletes the television show from the cable network headend via a user interface (e.g., select and click using the set top box's remote control) on the set top box which communicates with the cable network headend to delete the television show. The deletion of the television show provides enough space in the limited storage on the cable network headend for more content. The cable network headend sends a request message for the URL of the next entry for content to the VOD queue management service. The VOD queue management service sends a reply message with the URL for the next content (in this example, a television show entitled "Wow Dog" with the URL http://web.networktelevision.abc/Wow/ep4.mpeg) to the cable network headend. The cable network headend then downloads the next television show from the web server identified by the URL (in this example, http://web.networktelevision.abc/Wow/ep4.mpeg) and stores the mpeg file. The next television show entitled "Wow Dog" is then available when the subscriber decides to watch the television show.

As a further example, the subscriber scrolls through the list of content stored at the cable network headend via a user interface (e.g., select and click using the set top box's remote control) on the set top box. The subscriber selects the television show entitled "Wow Dog" from the list of available content stored on the cable network headend for viewing and the cable network headend transmits the selected television show to the set top box for viewing on the subscriber's television. Due to the limited storage in the cable network headend due to cost and technical constraints, the cable network headend can only download and store a selection of the content that the subscriber wants to view at given time. The VOD queue management service can maintain the queue of content that the subscriber wants to view and provide the entries from the queue to the cable network headend as storage space permits.

Storage Management System

FIG. 1 is a functional block diagram of a system 100 illustrating storage management of multimedia content according to one embodiment. The system includes a remote content server A 110a and a remote content server B 110b (generally 110). The system further includes a network 120, a queue management module 130, a media computer 140, a viewing device 144, a computing device 150, a video distribution module 160, a set top box 168a, a set top box 168b, and a viewing device 169. The video distribution module 160 (e.g., cable network headend, telephone network video headend office, etc.) communicates with set top boxes 168a and 168b (generally 168). The system further includes two subscribers 170a and 170b (generally 170). The first subscriber 170a is associated with the media computer 140 (e.g., personal computer with Microsoft® XP Media Center) and the viewing device 144. The second subscriber 170b is associated with the personal computer 150, the set top box 168b, and the viewing device 169.

The subscriber 170 utilizes the media computer 140 and/or the computing device 150 to browse a website associated with the remote content server 110. The subscriber 170 selects multimedia content and/or subscribes to multimedia content via the remote content server's 110 website. The remote content server 110 transmits a message the queue management module 130. The queue management module 130 receives the message to queue location information (e.g., URL, media identification, etc.) for the multimedia content. The queue management module 130 stores the location information in a queue corresponding to the subscriber 170. The subscriber 170 is associated with a video distribution module 160 and/or a media computer 140 which provides limited storage for personalized multimedia content (e.g., one hundred gigabytes, twenty television programs, etc.).

The queue management module 130 receives a message for location information from the video distribution module 160 and/or the media computer 140. The queue management module 130 transmits a message for retrieval of multimedia content to the video distribution module 160 and/or the media computer 140. The message for retrieval of multimedia content directs the video distribution module 160 and/or the media computer 140 to retrieve the multimedia content from location information next in the queue for storage in the limited storage.

The video distribution module 160 and/or the media computer 140 transmit a message for location information for multimedia content to a queue management module 130. The multimedia content is selected or subscribed to at the remote content server 110 by the subscriber 170. The queue management module 130 maintains a plurality of queues for individual subscribers (e.g., 170a). Each queue includes location information for a plurality of multimedia content.

The video distribution module 160 and/or the media computer 140 receive a message for retrieval of content from the queue management module 130. The message for retrieval of content includes the location information next in the queue associated with the subscriber 170. The video distribution module 160 and/or the media computer 140 retrieves the multimedia content from the remote content server 110 using the location information received in the message for retrieval of content. The video distribution module 160 and/or the media computer 140 identifies available storage in limited storage provided for the subscriber 170 and stores the retrieved multimedia content in the limited storage for the subscriber 170. An advantage is that the system 100 can retrieve multimedia content from a plurality of remote content servers which increases the total amount of available multimedia content for the subscribers of the system 100.

The subscriber 170 views the stored multimedia content by selecting the stored multimedia content via a user interface on the media computer 140 and/or a set top box 168b. The subscriber 170 views the stored multimedia content through the viewing device 144 or 169 (e.g., television, cell phone, personal computer, etc.).

In some examples, a subscription of multimedia content includes selecting a television series, a movie series, a web multimedia series, and/or any other type of multimedia content that includes more than one part. For example, the subscriber 170 can select to subscribe to the "Find Your Dream House" television program. The current "Find Your Dream House" is selected for the subscriber's 170 queue and all future episodes of the television program will be automatically selected for the subscriber's queue.

The subscriber's personal identifying information (e.g., name, email address, phone number, etc.) can be, for example, associated with the subscription of multimedia content. The subscriber's personal identifying information can be stored by the remote content server 110 associated with the subscription and/or the queue management module 110. When the subscriber's personal identifying information is stored only by the queue management module 130, then a generic user account at the queue management module 130 can subscribe to the subscription of the multimedia content. The generic user account can be associated with the subscribers who have subscribed to the subscription of the multimedia content. In other examples, the queue management module 130 can communicate with the remote content server 110 on a periodic basis (e.g., hourly, daily, weekly, etc.) to determine if there are any updates to subscriptions. An advantage to utilizing the generic user account and/or the periodic update is that the subscriber can remain anonymous to the remote content server 110 while still receiving the updated multimedia content.

In other examples, the queue management module 130 determines the availability of multimedia content from the remote content server 110 based on the subscription of multimedia content for a subscriber 170. In some examples, the remote content server 110 determines the availability of multimedia content and transmits a subscription message regarding the available multimedia content to the queue management module 130. The queue management module 130 stores the location information for multimedia content in the queue of the subscriber 170 associated with the subscription. The subscription message can be an email, a really simple syndication (RSS) feed, a media RSS (MRSS) feed, and/or any other type of message.

The subscription preferences for the subscriber 170 can be, for example, set to require a confirmation from the subscriber 170 before the location information is stored in the queue (e.g., via a user interface at the set top box 168, via an email from the queue management module 130, etc.) and/or can automatically add the location information to the beginning of the queue (i.e., first queue entry) or the end of the queue (i.e., last queue entry). The availability of multimedia content can be determined in a sequentially order (e.g., alphabetical by name, sequential by identification number, etc.), based on the subscription preferences (e.g., weekly, monthly, etc.), and/or by any other type of manually or automatic multimedia content determination.

In some examples, the video distribution module 160 maintains information regarding all of the multimedia content stored in the video distribution module 160. For each request for multimedia content, the video distribution module 160 can determine if the requested multimedia content is stored by the video distribution module 160. If the requested multimedia content is stored by the video distribution module 160, then the network bandwidth and processing time associated with the retrieval and storage of multimedia content can advantageously be decreased.

In other examples, the remote content server 110 includes personal content (also referred to as consumer generated content), independent content, and/or professional content. The independent content can include independent movies, internet-only content, and/or the like. The professional content can include premium content, television shows, movies, and/or the like. An advantage is that the subscribers have access to a variety of content of the subscriber's choice and available content is not limited to a library selected by a third party.

Video Distribution Module

Figure 2:
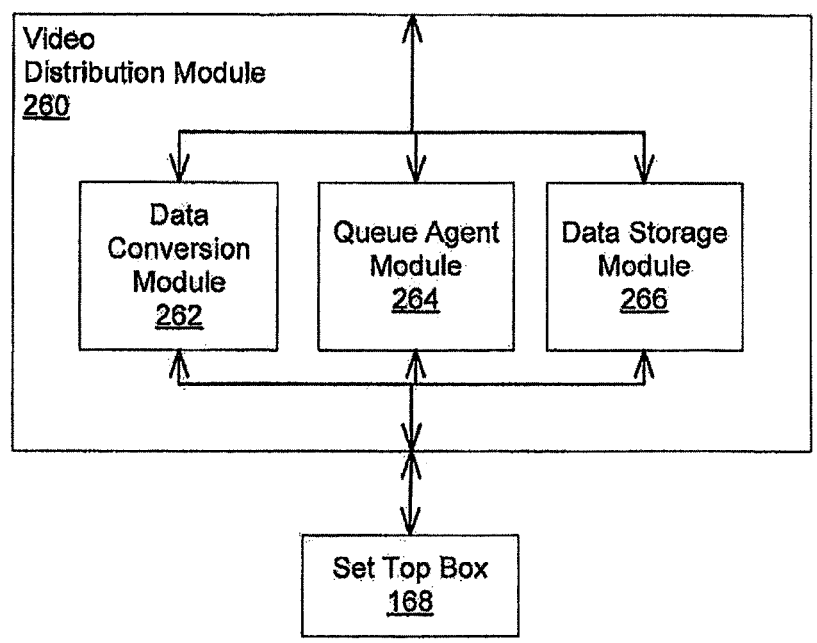
FIG. 2 is a functional block diagram of a video distribution module.

FIG. 2 is a functional block diagram of a system 200 with a video distribution module 260. The system 200 includes the video distribution module 260 and the set top box 168. The video distribution module 260 includes a data conversion module 262, a queue agent module 264, and a data storage module 266. The queue agent module 264 transmits a message for location information to the queue management module 130 of FIG. 1. The message for location information is for multimedia content which is selected or subscribed to by the subscriber 170 at the remote content server 110. The queue agent module 264, in turn, receives a message for retrieval of content from the queue management module. The message for retrieval of content includes the location information next in a queue associated with the subscriber 170.

The queue agent module 264 requests the multimedia content from the remote content server 110. The data conversion module 262 receives the multimedia content from the remote content server 110. For purposes of VOD functionality, the data conversion module 262 can generate one or more trick files based on the multimedia content and/or can transcode the multimedia content into a format for displaying on a viewing device (e.g., television, cell phone, etc.). For example, the multimedia content can be converted from a non-moving picture experts group (MPEG) format to MPEG format (e.g., audio video interleave (AVI) format, etc.). The one or more trick files and/or the ingested multimedia content are stored on the data storage module 266.

The subscriber 170 utilizes a user interface on the set top box 168 via the viewing device 169 to select multimedia content for viewing. The set top box 168 communicates with the queue agent module 264 to display the list of available multimedia content to the subscriber 170 and/or to start the viewing of the requested multimedia content. The data storage module 266 transmits the requested multimedia content to the viewing device associated with the set top box 168. The viewing device receives the requested multimedia content from the data storage module 266 and displays the requested multimedia content.

In some examples, the data storage module 266 identifies available storage in limited storage provided for the subscriber 170. The data storage module 266 includes limited storage for a plurality of subscribers. The size of the limited storage can be based on the number of subscribers assigned to the video distribution module, a service level purchased by the subscriber 170, and/or any other type of storage allocation. For example, the data storage module 266 includes two terabytes of storage for multimedia content and the video distribution 260 has one hundred subscribers. In this example, each subscriber has ten gigabytes of available storage on the data storage module 266.

Multimedia Storage

Figure 3:
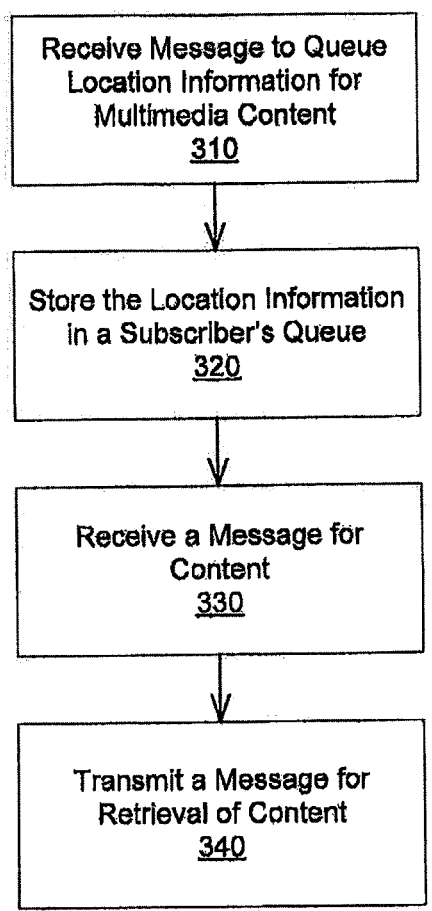
FIG. 3 is an exemplary flowchart depicting processing of multimedia content.

FIG. 3 is an exemplary flowchart 300 depicting processing of multimedia content through the exemplary system 100 of FIG. 1. The queue management module 130 receives (310) a message to queue location information for multimedia content from the remote content server 110. The queue management module 130 stores (320) the location information in a subscriber's queue. The queue management module 130 receives (330) a message for location information from the video distribution module 160. The queue management module 130 transmits (340) a message for retrieval of multimedia content to the video distribution module 160.

In some examples, the message to queue location information includes location information for the multimedia content. The location information can be a uniform resource locator (URL) (e.g., http://snow.ww.123, ftp://network.multimedia.323, etc.), a location identifier (e.g., HomeVideoWWW-6311, LocalTV-353, etc.), and/or any other type of source information.

In other examples, the subscriber's queue includes the location information for more multimedia content than the video distribution module 160 can retrieve and store in the limited storage provided for the subscriber 170. An advantage of the queue is that the subscriber 170 can select more multimedia content than is possible for immediate storage which enables the subscriber 170 to select a plurality of multimedia content while only using a portion of the storage needed for the selected multimedia content.

In some examples, the message for retrieval of multimedia content includes location information, an authentication token, user identification information, content expiration information, and/or any other type of information associated with multimedia content. The message for retrieval of multimedia content and/or parts of the message can be stored in the queue.

The queue management module 130 can, for example, receive the authentication token from the remote content server 110. The queue management module 130 can store the authentication token in the queue and transmit the authentication token to the video distribution module 160 in the message for retrieval of multimedia content. The authentication token can be utilized to retrieve the multimedia content from the location information and/or enable authentication of the video distribution module 160 with the remote content server 110 associated with the location information.

In other examples, the subscriber 170 is authenticated by the remote content server 110. The remote content server 110 can generate a validation code which is transmitted with the message to queue location information by the remote content server 110 to the queue management module 130. The queue management module 130 can store the validation code and then transmit the validation code to the video distribution module 160 when the next queue entry is requested. The video distribution module 160 can utilize the validation code to retrieve the multimedia content from the remote content server 110. An advantage to the validation code is that the user's authentication information for the remote content server 110 can remain hidden from the queue management module 130.

Figure 4:
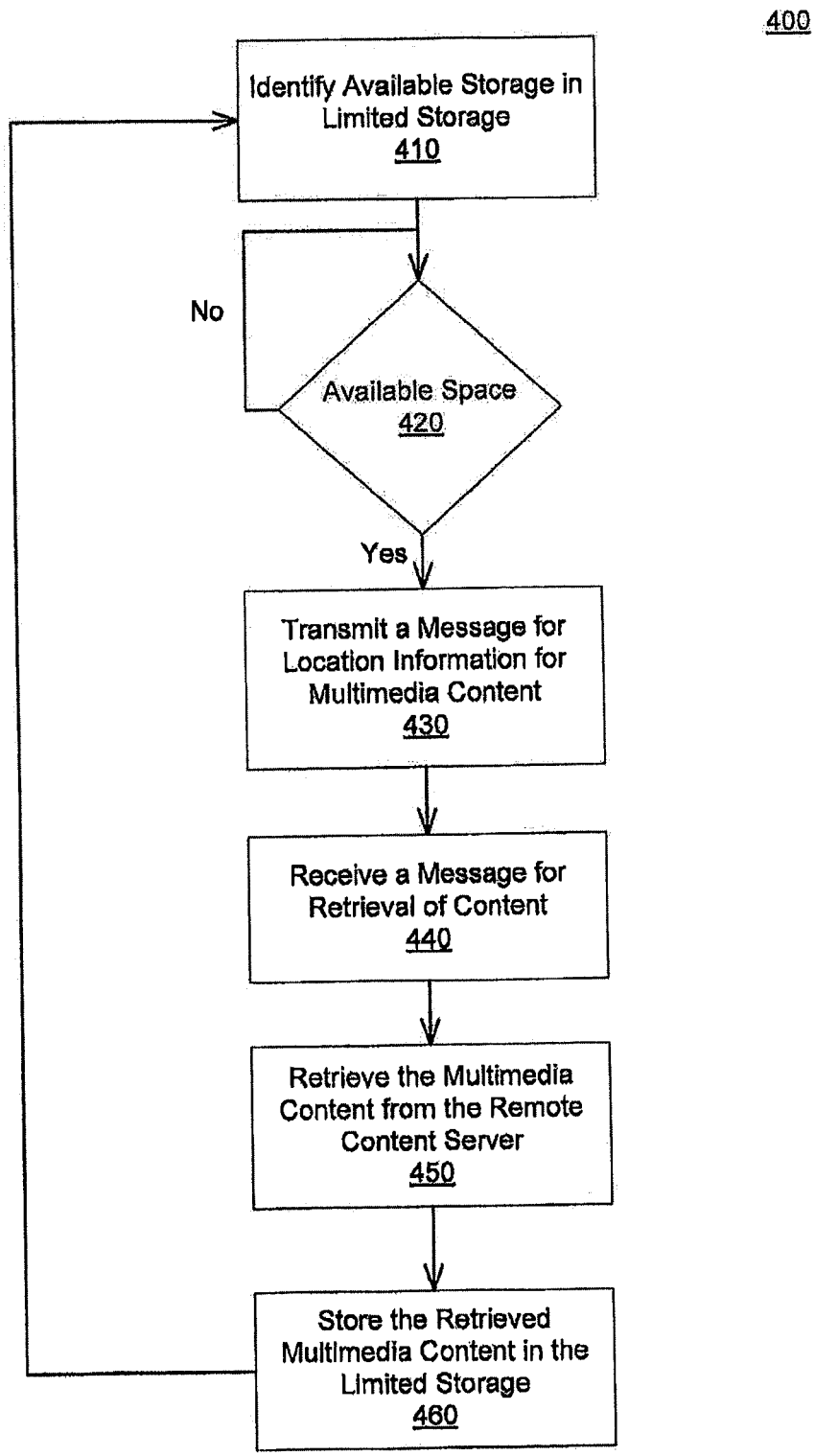
FIG. 4 is an exemplary flowchart depicting processing and storing of multimedia content.

FIG. 4 is an exemplary flowchart 400 depicting processing and storing of multimedia content through the systems 100 and 200 of FIGS. 1 and 2, respectively. The data storage module 266 identifies (410) available storage in limited storage for each subscriber in the data storage module 266. If there is no available space (420), then the data storage module 266 continues checking for available space in the limited storage for each subscriber. If there is available space (420), then the data storage module 266 communicates with the queue agent module 264 which transmits (430) a message requesting location information for multimedia content to the queue management module 130. The queue management module 130 receives the request message for location information for multimedia content and transmits a reply message for retrieval of the multimedia content.

The queue agent module 264 receives (440) the reply message from the queue management module 130. The queue agent module 264 directs the data conversion module 262 to retrieve (450) the multimedia content from the remote content server 110 identified by the location information. The data conversion module 262 can optionally create one or more trick files for the received multimedia content and/or then ingest the received multimedia content. The data storage module 266 stores (460) the retrieved multimedia content which was ingested and the trick files in the limited storage for the subscriber 170. After the retrieved multimedia content is stored (460) by the data storage module 266, the data storage module 266 continues identifying (410) available storage in the limited storage for each subscriber.

In some examples, the identification (410) of available storage by the data storage module 266 includes identifying the amount of free storage for each subscriber in the subscriber's limited storage. The identification (410) of available storage can include determining if the amount of free storage is above a pre-defined threshold (e.g., 10% of the amount of limited storage, one gigabyte, etc.) and/or above a dynamically determined threshold (e.g., 15% of the total storage divided by the number of subscribers associated to the video distribution module 160, 150% of the space required for the multimedia content associated with the next queue entry, etc.).

In other examples, the queue agent module 264 monitors the network 120. The queue agent module 264 can transmit (430) a message for location information for multimedia content based on the network conditions (e.g., network bandwidth, network latency, etc.) and/or based on the available storage in the subscriber's limited storage.

FIG. 5 is another exemplary flowchart 500 depicting processing of multimedia content. The flowchart 500 includes a subscriber 510, a remote content server 512, a queue management module 516, a queue agent module 518, a data conversion module 520, a data storage module 522, and a set top box 524. The subscriber 510 selects (531) content via a remote content server 512. The remote content server 512 transmits (532) a message which includes location information of the selected content to the queue management module 516 which adds the location information of the selected content to a queue associated with the subscriber 510.

The queue agent module 518 requests (533) location information for the next entry in the subscriber's queue associated with the subscriber's set top box 524. The queue management module 516 transmits (534) the location information from the next entry in the subscriber's queue to the queue agent module 518. The queue agent module 518 can directly or indirectly through the data conversion module 520 request (535) the content from the remote content server 512 based on the location information. The remote content server 512 transmits (536) the content to the data conversion module 520. The data conversion module 520 processes the content (e.g., creates one or more trick files, ingests the content, etc.) and transmits (537) the processed content to the data storage module 522 which stores the processed content.

The subscriber 510 submits (538) a request to view content to the set top box 524 (e.g., via a user interface on the set top box 524, via a remote control associated with the set top box 524, etc.). The set top box 524 requests (539) content from the data storage module 522 based on the request to view content from the subscriber 510. The data storage module 522 transmits (540) the requested content to the set top box 524 and the set top box 524 displays (541) the requested content to the subscriber 510 via a viewing device.

In some examples, the queue management module 516 manages a plurality of queues. Each queue in the plurality of queues can be associated with an individual subscriber. The plurality of queues can be grouped into one or more groups. The groups of queues can be associated with each other as a friend association, a community association, a list association and/or any other type of association associated with a queue. For example, Joe Smith and Jerry Smith are associated with each as friends based on their preferences stored by the queue management module 516. In this example, Joe's queue and Jerry's queue are grouped together based on the friend preferences by each of the subscribers. As another example, June Smith and Joanna Smith are associated with each other because June and Joanna are members of the "Smith Family" community. In this example, June's queue and Joanna's queue are grouped together based on the community preferences by each of the subscribers.

In other examples, the queue management module 516 maintains descriptive information about a plurality of multimedia content associated with remote content servers. The descriptive information about the plurality of multimedia content includes types of metadata associated with multimedia content (e.g., writer, producer, year, audience rating, encoding information, size, etc.). After the queue management module 516 receives the message with the location information of the selected content, then the queue management module 516 determines if there is already information about the multimedia content. If the queue management module 516 already has information about the multimedia content, then the queue management module 516 utilizes the stored information for the queue entry. If the queue management module 516 does not already have information about the multimedia content or only has some of the information, then the queue management module 516 retrieves the information from the received message, from the remote content server 512, and/or other third party servers (e.g., movie database, television database, etc.). After the queue management module 516 receives the information about the multimedia content, then the queue management module 516 can add the information to the queue entry for the multimedia content in the queue associated with the subscriber 510.

Subscriber Queues

FIGS. 6A and 6B are exemplary queues 600a and 600b, respectively, depicting processing of multimedia content through the exemplary flowchart 500 of FIG. 5 at different times. Each queue 600a or 600b includes queue identifier 610a or 610b, a name 620a or 620b, an address 630a or 630b, and a program identifier 640a or 640b, respectively. Each queue 600a and 600b includes one or more queue entries which are utilized to store content requested by the subscriber 510. Each queue 600a and 600b includes the queue entries in an order. The queues 600a and 600b are maintained by the queue management module 130 which adds, edits, reorders, and/or deletes queue entries.

In some examples, the order of the queue entries in the queue 600a or 600b is modified. The queue management module 516 can receive a message to modify the order of the queue entries and modify the order of the queue entries based on the message to modify. The message to modify the order can be transmitted from the remote content server 512, the set top box 524, a queue management user interface of the queue management module 516, and/or any other type of queue management user interface. The modification can includes deleting, adding, editing, re-ordering, and/or any other type of modification. For example, the subscriber 510 sends a message to modify the order of the queue entries to the queue management module 516 via the set top box 524. The subscriber 510 requests that the queue entry no. 6, entitled "Pasta with Shrimp Ragu," be removed from the queue 600a. The queue management module 516 processes the message to modify the order and removes the queue entry no. 6, entitled "Pasta with Shrimp Ragu," from the queue 600a as illustrated by the updated queue 600b.

In other examples, each queue entry includes user identification information (e.g., username and password, authentication token, temporary password, etc.), queue order information, content location information (e.g., URL, network address, etc.), content identification information (e.g., program identifier, program name, title, show number, program number, etc.), content expiration information (e.g., days for viewing, date, number of views, etc.), community information, friend information, list information, and/or any other type of information associated with multimedia content. For example, a queue entry includes for a television program includes the title (in this example, "Find Your Dream House"), queue order information (in this example, number four), friend information (in this example, George McFly), and content expiration information (in this example, content expires forty hours after the first viewing). As another example, a queue entry includes for a movie includes the title (in this example, "Field of Broccoli"), queue order information (in this example, number one), and community information (in this example, Vegetable Sightings).

For example, the subscriber 510 selects (531) the "Pasta with Shrimp Ragu" television show via the remote content server 512 for Network Television. The remote content server 512 transmits (532) a message which includes the name of the television show, "Pasta with Shrimp Ragu," the address of the television show, NetworkTV-63, and the program identifier, "LNCS-235," to the queue management module 516. The queue management module 516 adds the location information of the selected content to the queue 600a which is associated with the subscriber 510.

The queue agent module 518 requests (533) location information for the next entry in the subscriber's queue associated with the subscriber's set top box 524. In queue 600a, the next entry is for the web broadcast entitled "The State of Snowboarding." The queue management module 516 transmits (534) the location information from the next entry, http://snow.ww.123, and the program identifier, FTD-2332352A, in the subscriber's queue to the queue agent module 518. After transmission of the location information, the queue management module 516 removes the queue entry from the queue 600a. In this example, the queue 600a is updated to the queue 600b. In the queue 600b, the next entry is the home video entitled "Come Out and Play."

In other examples, the network television program entitled "Pasta with Shrimp Ragu" is removed from the queue 600a by the subscriber 510 via a user interface on the queue management module 516. In this example, the queue 600b illustrates that the network television program entitled "Pasta with Shrimp Ragu" is removed from the queue 600a as illustrated by the updated queue 600b.

As another example, the queue agent module 518 requests (535) the content entitled "The State of Snowboard" from the remote content server 512 based on the location information, the address http://snow.ww.123. The remote content server 512 transmits (536) the content of the program to the data conversion module 520. The data conversion module 520 processes the content (e.g., creates one or more trick files, ingests the content, etc.) and transmits (537) the processed content to the data storage module 522 which stores the processed content.

Remote Content User Interface

Figure 7A:
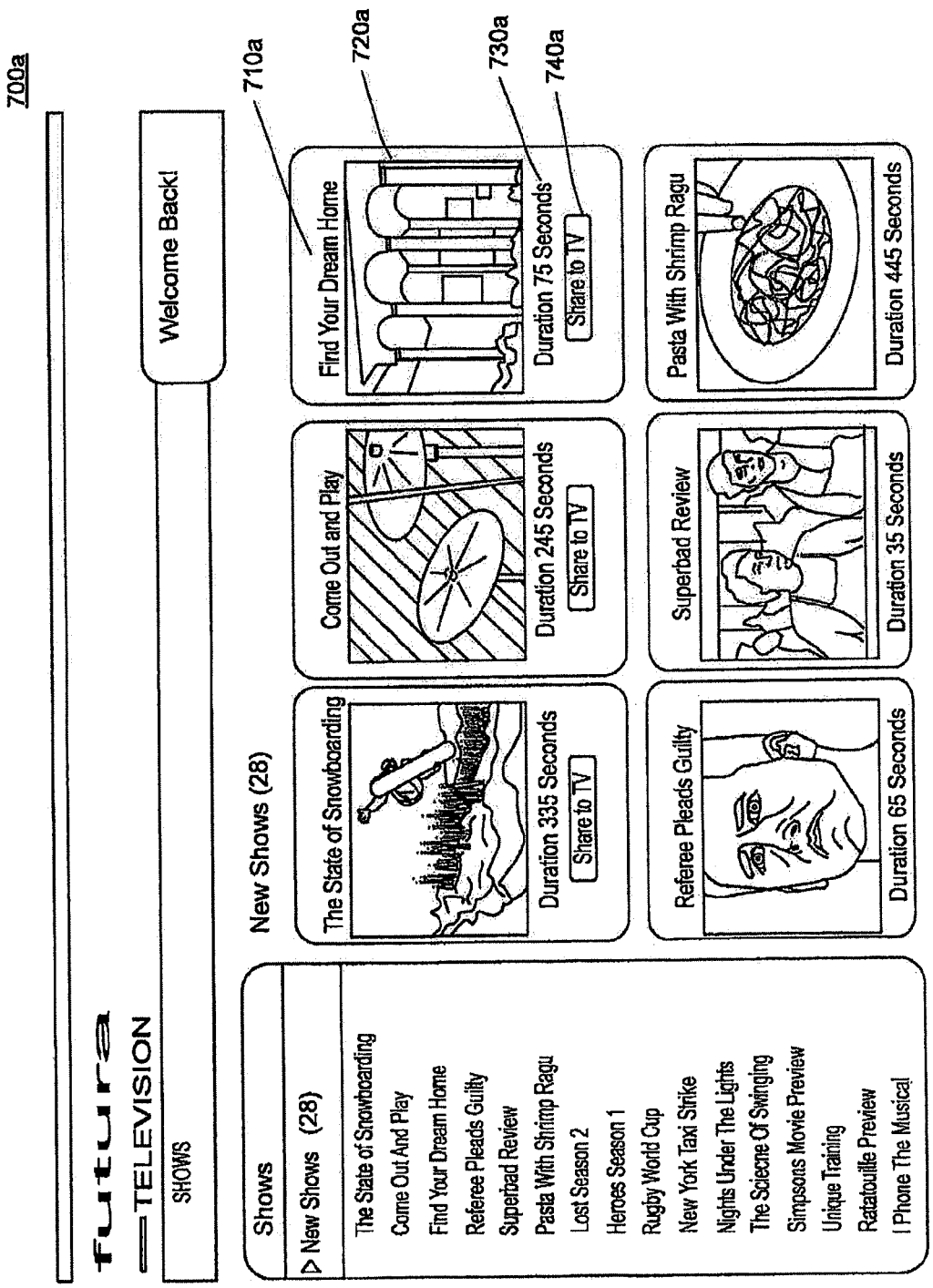
FIGS. 7A and 7B are exemplary screenshots of a remote content user interface.

FIG. 7A is exemplary screenshot 700a of a remote content user interface provided by the remote content server 110 of FIG. 1. The screenshot 700a illustrates multimedia content that is available to subscribers 170. In this example, the subscriber 170 can select the content entitled "The State of Snowboarding," "Come Out and Play," "Find Your Dream House,"

"Referee Pleads Guilty," "Superbad Review," and/or "Pasta with Shrimp Ragu." Each content listing includes a title area 710a, an image area 720a, a time area 730a, and a "Share to TV" button 740a. The subscriber 170 can browse through the content listings in the user interface and then select one or more of the content via the "Share to TV" button 740a. The "Share to TV" button 740a can provide a one-click interface to submit requests for multimedia content to the queue management module 130.

For example, the subscriber 170b utilizing the computing device 150 with a web browser to view the listings of content as illustrated by the screenshot 700a from remote content server B 110b. The subscriber 170b selects the "Share to TV" button 740a for the content entitled "Find Your Dream House." The remote content server B 110b transmits a message to the queue management module 130. The message includes the title, the location, and program identifier of the selected content. The queue management module 130 receives (310) the message to queue. The remote content server B 110b also transmits a redirect message to the subscriber's web browser which directs the subscriber's web browser to a website of the queue management module 130 so that the queue management module 130 can determine the identity of the subscriber 170. After the identity of the subscriber 170 is determined, the queue management module 130 adds a queue entry to the queue. In this example, the queue entry for "Find Your Dream House" is added to the subscriber's queue 600a as queue entry three since it was selected before queue entries four through six were added to the queue 600a.

In some examples, the identity of the subscriber 170 is determined based on an automatic identify check (e.g., cookie, network address, etc.), an authentication check (e.g., username and password, randomly assigned identification, etc.), and/or by any other type of identification mechanism. For example, the queue management module 130 determines the identity of the subscriber 170 utilizing a cookie saved by the subscriber's web browser. After the queue management module 130 processed the message, the subscriber's web browser can be automatically redirected to the remote content server's website. In this example, the subscriber 170 does not have to be aware that the request was sent to the queue management module 130 since the subscriber's web browser was automatically redirected back to the remote content server's website.

Figure 7B:
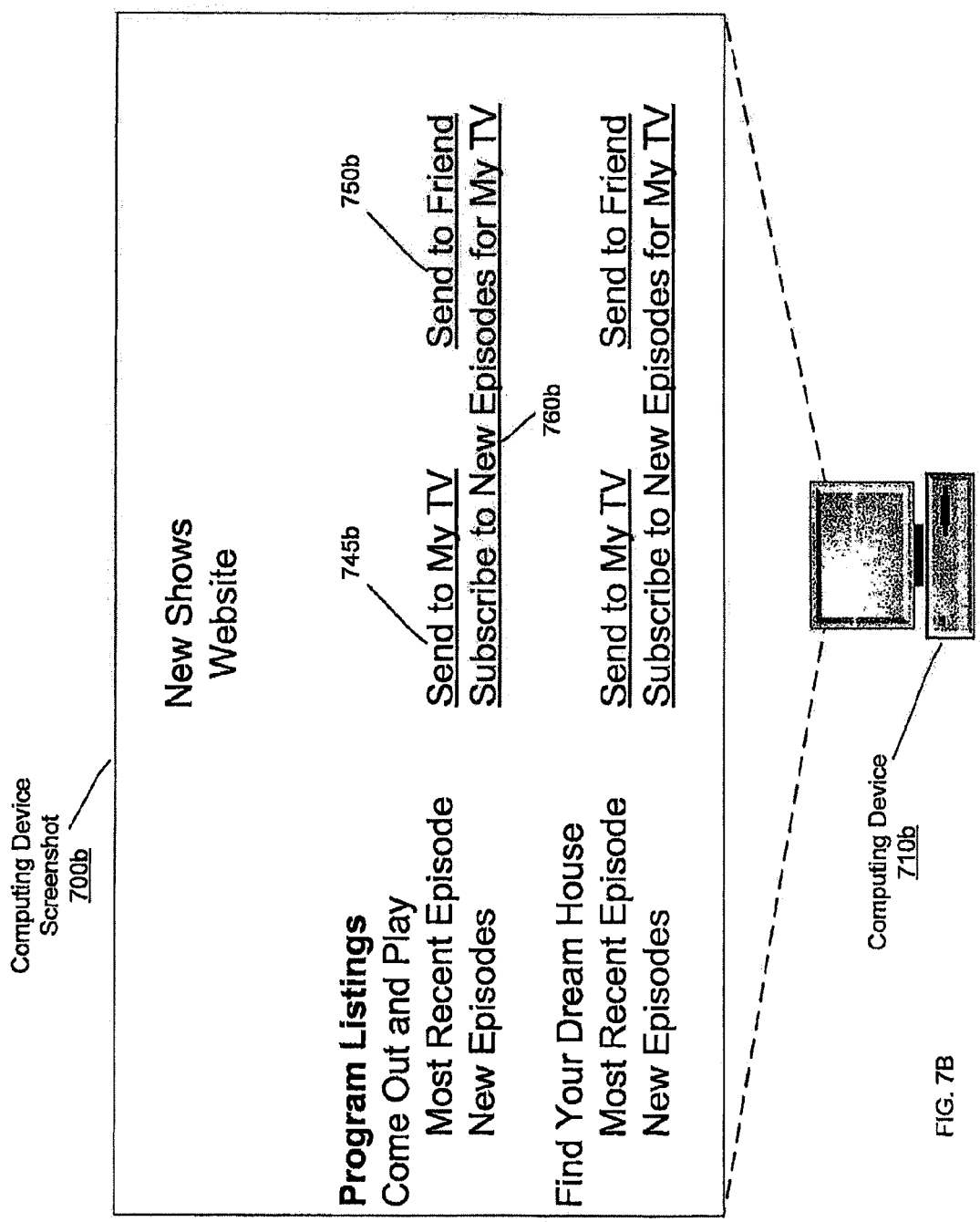

FIG. 7B is another exemplary screenshot 700b of a remote content user interface provided by the remote content server 110 of FIG. 1 and displayed by the computing device 710b. The screenshot 700b illustrates multimedia content that is available to subscribers 170. In this example, the subscriber 170 can select the content entitled "Come Out and Play" and/or "Find Your Dream House." Each content listing includes a "Send to My TV" link 745b and a "Send to Friend" link 750b for the most recent episode and a "Subscriber to New Episodes for MyTV" link 760b for new episodes. The subscriber 170 can browse through the content listings in the user interface and then select one or more of the content via the links 745b, 750b, and/or 760b. The links 745b, 750b, and 760b can provide a one-click interface to submit requests for multimedia content, friend requests, and subscriptions, respectively, to the queue management module 130.

Preferences

FIG. 8 is an exemplary table 800 depicting community preferences in the exemplary system 100 of FIG. 1. The table 800 includes a community identifier 810 (also referred to as communityID) and a preference 820. The queue management module 130 of FIG. 1 manages a community table 800 for each subscriber 170. The subscriber 170 can manage the community table 800 via a user interface on the queue management module 130 and/or the set top box 168. The community identifiers 810 are a link to the different communities which a subscriber 170 can be a member. The preferences 820 are set by the subscriber 170 to indicate how content from the community associated with the community identifier 810 is handled for the subscriber's queue (e.g., auto queue first, auto queue last, confirm, delete, etc.). Although FIG. 8 illustrates the community preferences in table format, the community preferences can be stored and/or managed in any type of format (e.g., linked list, flat list, etc.).

In some examples, the community information and/or preferences are established and/or maintained across a plurality of cable network providers. The queue management module 130 can manage the communities for a plurality of cable network providers. The centralized management of the communities advantageously allows subscribers across the country and the world to share multimedia content.

FIG. 9 is an exemplary table 900 depicting friend preferences in the exemplary system 100 of FIG. 1. The table 900 includes a friend identifier 910 (also referred to as friendID) and a preference 920. The queue management module 130 of FIG. 1 manages a table 900 for each subscriber 170. The subscriber 170 can manage the table 900 via a user interface on the queue management module 130 and/or the set top box 168. The friend identifiers 810 are a link to the different friends which a subscriber 170 is associated with. The preferences 920 are set by the subscriber 170 to indicate how content from the friend associated with the friend identifier 810 is handled for the subscriber's queue (e.g., auto queue first, auto queue last, confirm, delete, etc.). Although FIG. 9 illustrates the friend preferences in table format, the community preferences can be stored and/or managed in any type of format (e.g., linked list, flat list, etc.).

For example, the subscriber 170b of FIG. 1 utilizing the computing device 150 with a web browser to view the listings of content as illustrated by the screenshot 700b of FIG. 7B from remote content server B 110b. The subscriber 170b selects the "Send to Friend" button 750b for the content entitled "Come Out and Play." The remote content server B 110b transmits a message to the queue management module 130. The message includes the title, the location, program identifier, and the share with a friend information (e.g., information that the request is for a friend and not the subscriber). The queue management module 130 receives (310) the message to queue. The remote content server B 110b also transmits a redirect message to the subscriber's web browser which directs the subscriber's web browser to a website of the queue management module 130 so that the queue management module 130 can determine the identity of the subscriber 170 and request the any further share with a friend information. After the identity of the subscriber 170 is determined, the queue management module 130 continues processing the share with a friend as described below.

In this example, George1234 is the subscriber that submitted the "Share with Friend" request for "Come Out and Play." The queue management module 130 requests the identity of the subscriber to share the multimedia content. George1234 selects Edward3522 as the friend to share. Edward3522's friend preferences are illustrated by the table 900. Based on the preferences stored in the table 900, George1234's share with friend request is auto queued last in Edward3522's queue. As such, a queue entry for "Come Out and Play" is added to the end of Edward3522's queue.

User Interfaces

FIG. 10 is an exemplary screenshot 1000 of a user interface provided by the remote content server 110 of FIG. 1 and displayed by a computing device 1010. The screenshot 1000 illustrates the communities that are available to subscribers 170. In this example, the subscriber 170 can select the communities entitled "Soap Operas," "Drama Movies," and/or "Comedy Troopers." Each community listing includes an "Auto Queue First" link 1020, an "Auto Queue Last" link 1030, and a "Confirm" link 1040. The subscriber 170 can browse through the community listings in the user interface and then select one or more of the options for each community via the links 1020, 1030, or 1040.

For example, the subscriber 170 selects the "Auto Queue First" link 1020 for the "Soap Operas" community listing. The community identifier 810 and preference 820 are added to the community preference table 800 associated with the subscriber 170. In this example, the community identifier is "Soap Operas" and the preference is "Auto Queue First." When the queue management module 130 receives an update to the "Soap Operas" community, then the multimedia content associated with the update is automatically queued to the beginning of the queue associated with the subscriber 170. As such, the multimedia content associated with the update is the next queue entry in the subscriber's queue.

Figure 11A:
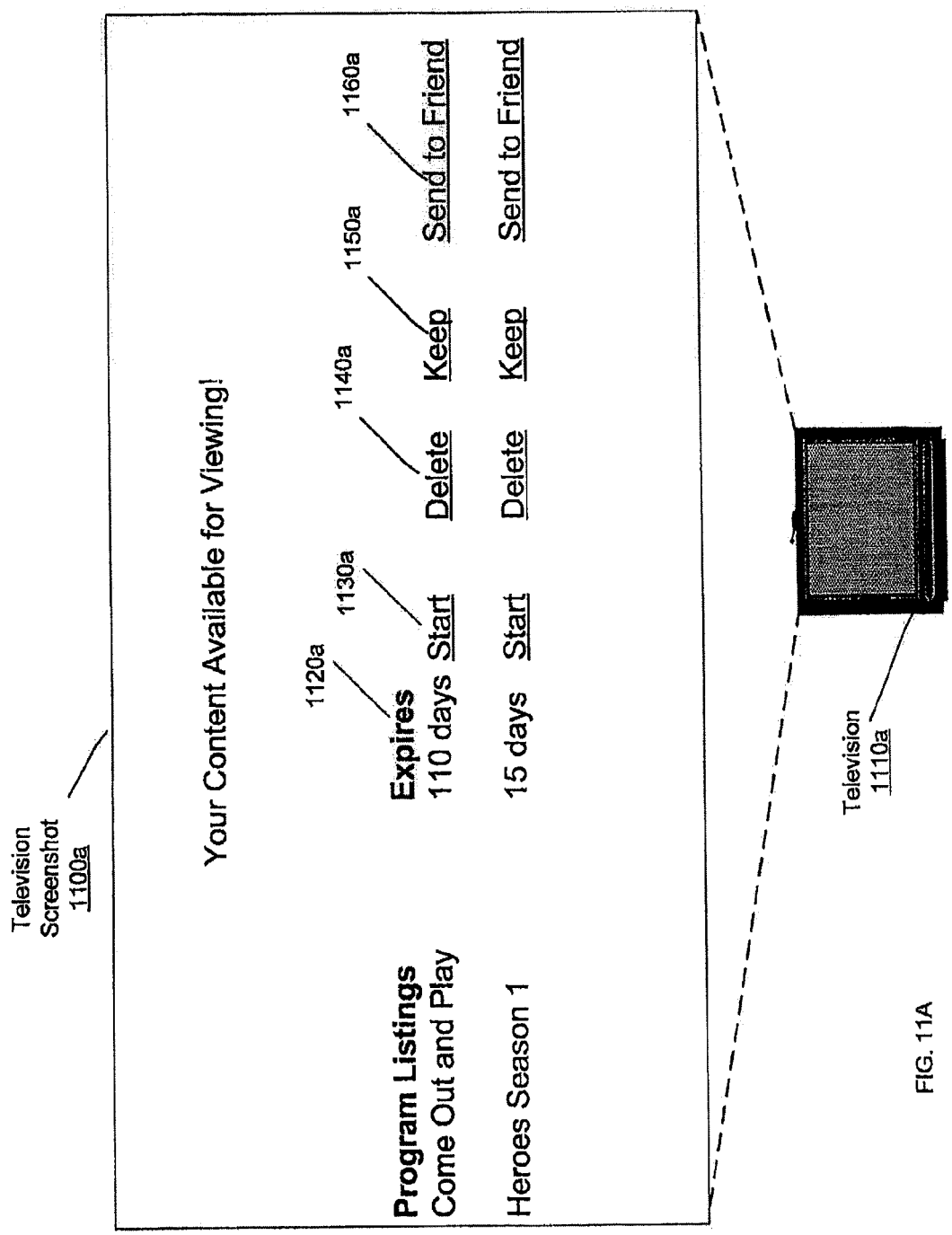
FIGS. 11A, 11B, and 11C are exemplary screenshots of a queue management user interface.

FIG. 11A is an exemplary screenshot 1100a of a queue management user interface provided by the video distribution module 160 of FIG. 1 and displayed by a computing device 1110a. The screenshot 1100a illustrates multimedia content that is available to subscribers 170 and stored on the video distribution module 160. In this example, the subscriber 170 can select the content entitled "Come Out and Play" and/or "Heroes Season 1." Each content listing includes an expiration area 1120a, a "Start" link 1130a, a "Delete" link 1140a, a "Keep" link 1150a, and a "Send to Friend" link 1160a. The subscriber 170 can browse through the content listings in the user interface and then select the appropriate link 1130a, 1140a, 1150a, and/or 1160a.

For example, the subscriber 170 selects the "Start" link 1130a for the "Come Out and Play" program. The video distribution module 160 transmits the program to the viewing device 169 via the set top box 168.

As another example, the "Heroes Season 1" program is going to expire in fifteen days, but the subscriber 170 is out of town for the next twenty days and wants to watch the program upon his/her return. As such, the subscriber 170 selects the "Keep" link and the expiration date is extended a set time or a selected time.

Figure 11B:
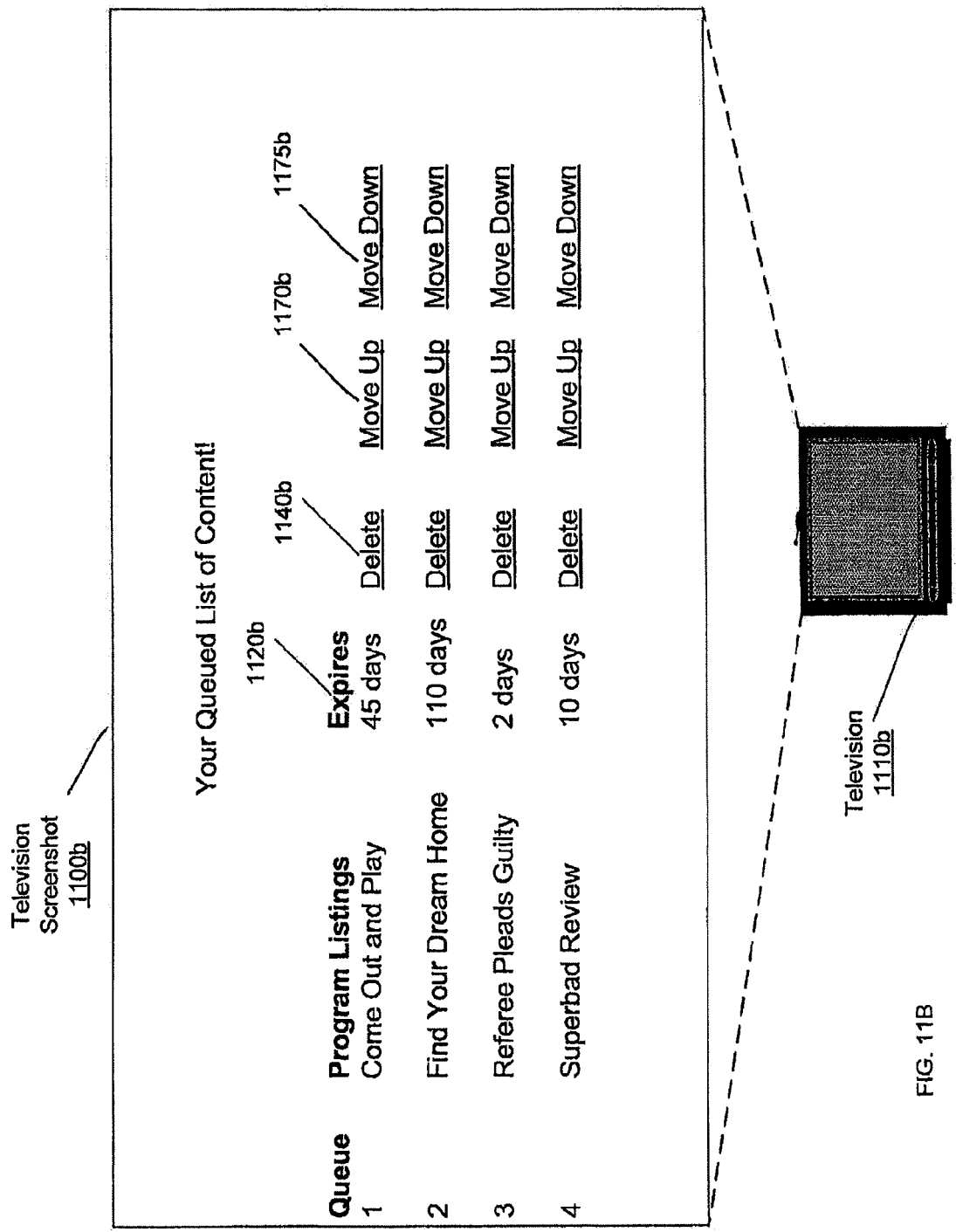

FIG. 11B is an exemplary screenshot 1100b of a queue management user interface provided by the queue management module 130 and/or the video distribution module 160 of FIG. 1 and displayed by a computing device 1110b. The screenshot 1100b illustrates multimedia content that is queued in the subscriber's queue. In this example, the subscriber's queue includes "Come Out and Play," "Find Your Dream House," "Referee Pleads Guilty," and "Superbad Review." Each content listing includes an expiration area 1120b, a "Delete" link 1140b, a "Move Up" link 1170b, and a "Move Down" link 1175b. The subscriber 170 can browse through the content listings in the user interface and then select the appropriate link 1140b, 1170b, and/or 1175b.

For example, the subscriber 170 selects the "Delete" link 1130a for the "Come Out and Play" program. The video distribution module 160 transmits the delete request to the queue management module 130 which deletes the program from the subscriber's queue.

As another example, the "Referee Please Guilty" program is going to expire in two days, but the subscriber 170 wants to watch the program over the weekend which is in four days. As such, the subscriber 170 selects the "Keep" link. The video distribution module 160 transmits the keep request to the queue management module 130 which extends the expiration date a set time or a selected time.

For example, the subscriber 170 selects the "Move Up" link for the "Find Your Dream House" program because he/she wants to watch the program in the next few days. The video distribution module 160 transmits the modify queue entry request to the queue management module 130 which moves the "Find Your Dream House" up one entry in the queue (in this example, the program is now the first queue entry).

Figure 11C:
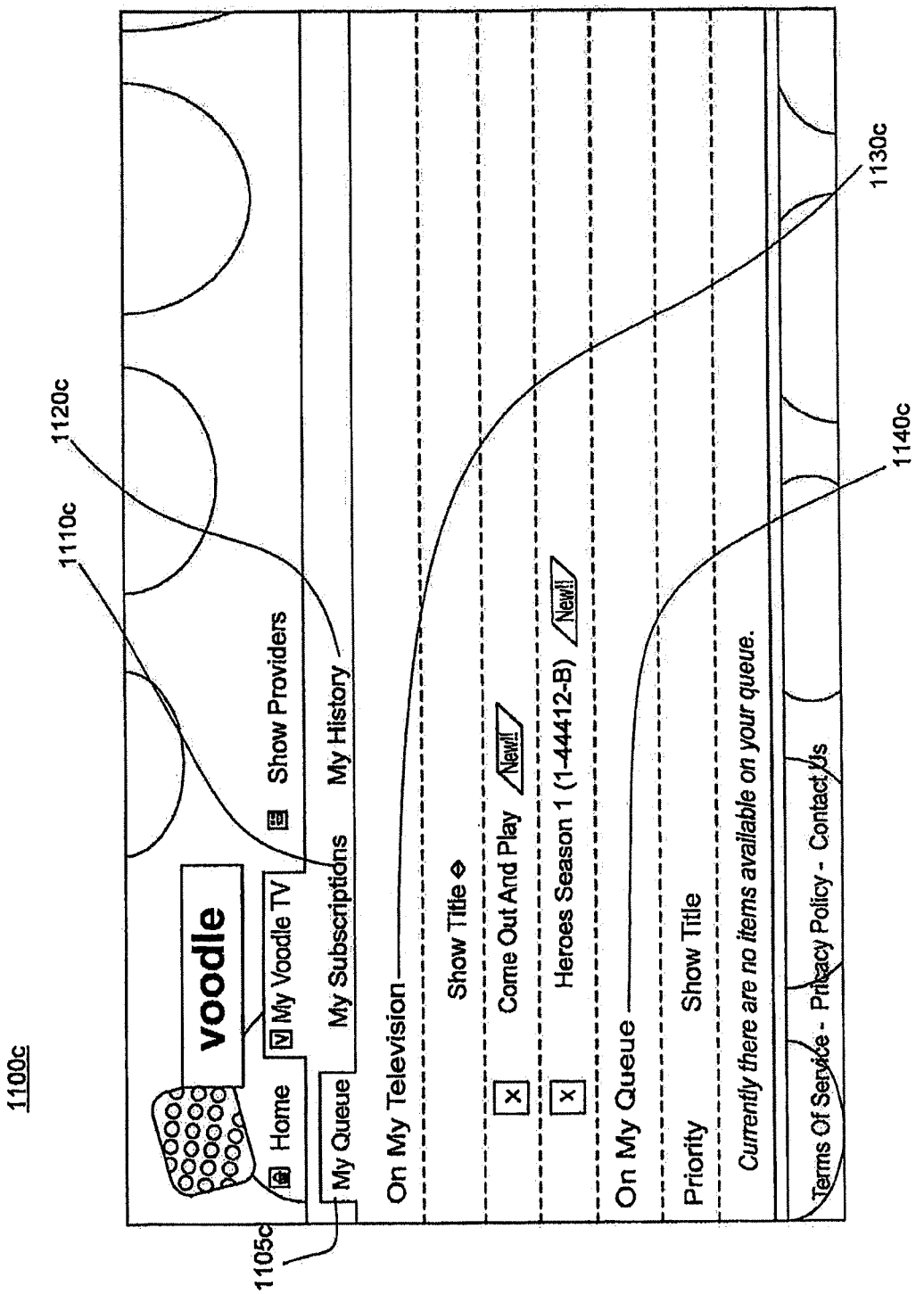

FIG. 11C is an exemplary screenshot 1100c of a queue management user interface provided by the queue management module 130 and/or the video distribution module 160 of FIG. 1 and displayed by a computing device 1110c. The screenshot 1100b illustrates multimedia content that is stored on the video distribution module 160 associated with the subscriber 170 in a "My Queue" tab 1105c. The user interface can display the multimedia content queued in the subscriber's queue via a "My Subscriptions" tab 1110c. The user interface can also display the subscriber's history of requested and/or viewed content via a "My History" tab 1120c. In this example, the subscriber's queue does not include any items as indicated under heading 1140c. The video distribution module 160 associated with the subscriber 170 includes "Come Out and Play" and "Heroes Season 1" as indicated under heading 1130c, "On My Television."

In some examples, the messages as described herein are an email message, a user datagram protocol (UDP) message, a transmission control protocol (TCP) message, a real-time transport protocol (RTP) message, a hypertext transfer protocol (HTTP) message, a real time streaming protocol (RTSP) message, and/or any other type of message communicated via a network. For example, the remote content server 110 of FIG. 1 transmits a HTTP message to the queue management module 130. The HTTP message includes the location information for the requested multimedia content (in this example, http://www.snowhow.tz/movie.avi) and the title of the multimedia content (in this example, "How to Make Snow").

In other examples, the video distribution module 160 of FIG. 1 provides an electronic program guide (EPG), VOD service, broadcast television service, internet service, and/or other types of television service. The media computer 140 can have the same functionality and/or user interfaces as the video distribution module 160 as described herein. The media computer 140 can store the multimedia content and/or can display the multimedia content for the subscriber 170.

In some examples, the multimedia content includes video, audio, text, still images, animation, interactive content, and/or any other type of media. For example, the multimedia content is a movie that includes the video, audio, and the text (e.g., closed caption, subtitles, etc.). As another example, the multimedia content is a media file (e.g., MPEG, AVI, etc.) that includes the video and audio in a single file.

Although a website for the remote content server 110 is described in reference to FIG. 1 for selecting and/or subscribing to multimedia content, the remote content server 110 can have a catalog and/or listing that a subscriber can utilize to select multimedia content. The catalog and/or listing can be provided in print format, as a stand-alone computer based application, via standard television programming guides, a centralized group catalog and/or listing for a group of remote content servers, and/or any other type of format.

Although FIG. 1 illustrates two remote content servers A 110a and B 110b, the system 100 can include any number of remote content servers. The remote content servers can be web servers and/or ftp server.

Although FIG. 1 illustrates one queue management module 130, the system 100 can include a plurality of queue management modules. The queue management modules can be associated with a geographic region (e.g., a queue management module for each time zone in the United States, a queue management module for each state in the United States, etc.), a cable television provider (e.g., a queue management module for each cable television provider, two queue management modules for each cable television provider, etc.), and/or any other type of association.

Although FIG. 1 illustrates one video distribution module 160, the system 100 can include a plurality of video distribution module. Each video distribution module in the plurality of video distribution module can be associated a cable television network, telco television network, internet protocol television (IPTV) network, any other type of multimedia network, and/or parts thereof (e.g., a headend, a central office, a distribution node, etc.).

Although FIG. 1 illustrates the video distribution module 160 storing the multimedia content, in some embodiments, the set top box 168 can store the multimedia content. For example, the subscriber 170 has a set top box 168 with limited storage (e.g., ten gigabytes, five hundred gigabytes, etc.). The set top box 168 can communicate directly with the queue management module 130 to request queue entries and the appropriate remote content server 110 to retrieve the multimedia content. In this example, the set top box 168 stores the multimedia content for viewing by the subscriber 170.

Although FIG. 1 illustrates one media computer 140, the system 100 can include any number of media computers. In other examples, the subscriber 170 can view the multimedia content via the viewing device 144 connected to the media computer 140 and/or can view the multimedia content via a viewing device integrated into the media computer 140.

Although FIG. 1 illustrates one network 120, the system 100 can include a plurality of networks. The plurality of networks can be interconnected together through an intranet, the interne, and/or any other type of network connection. The remote content server 110, the queue management module 130, the computing device 150, and/or the video distribution module 160 can be connected to different networks which are interconnected together through one or more networks.

Although FIG. 1 describes the subscriber's queue, the location information and order of entries can be stored in a list, a linked list, a table, and/or the like. For example, the queue management module 130 can manage the location information and the order of the entries uses a linked list where the entries are added, deleted, and/or edited accordingly.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or any other type of storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Information carriers suitable for embodying computer program instructions and data include all forms of non-volatile memory, including by way of example semiconductor memory devices. The removable storage device can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device.

The system can include clients and servers. A client and a server are generally remote from each other and typically interact through a communication network. The relationship of client and server arises by virtue of computer programs running on the respective computers and having a client-server relationship to each other.

The components of the system can be interconnected by any form or medium of digital data communication (e.g., a communication network). Data transmission and instructions can also occur over a communications network. Examples of communication networks include a local area network (LAN), a wide area network (WAN), the Internet, wired networks, wireless networks, a packet-based network, and/or a circuit-based network.

Packet-based networks can include, for example, the Internet, a carrier interne protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for storage management of multimedia content, the method comprising:
   identifying, by a computing device, space in data storage of a video distribution server allocated to a subscriber;
   when space is available in the data storage allocated to the subscriber, transmitting, by the computing device, a request message to a queue management server that maintains a plurality of queues for individual subscribers of the video distribution server, each queue comprising location information for multimedia content selected or subscribed to at a remote content server by a subscriber, the request message requesting the location information for multimedia content next in the queue corresponding to the subscriber;
   wherein the queue comprises the location information for multimedia content having a size greater than the data storage allocated to the subscriber;
   receiving, by the computing device, a retrieval message providing the requested location information from the queue management server;
   retrieving the multimedia content from the remote content server using the location information received in the retrieval message; and
   storing the retrieved multimedia content in the data storage allocated to the subscriber.

2. The method of claim 1 further comprising:
   receiving, by the computing device, the retrieved multimedia content from the remote content server;
   transcoding, by the computing device, the retrieved multimedia content into a format suitable for display on a viewing device; and
   generating, by the computing device, one or more trick files based on the transcoded multimedia content.

3. The method of claim 1, wherein the queue comprises a plurality of queue entries arranged in an order, the method further comprising:
   transmitting, by the computing device, a reorder message to the queue management server causing the queue management server to modify the order of the plurality of queue entries.

4. The method of claim 1 further comprising:
   transmitting the multimedia content from the data storage of the video distribution server to a viewing device associated with the subscriber for display.

5. The method of claim 1 further comprising:
   receiving, by the computing device, an authentication token in the retrieval message from the queue management server; and
   transmitting, by the computing device, the authentication token to the remote content server enabling the retrieval of the multimedia content.

6. A computer program product, tangibly embodied in a machine-readable storage device, for storage management of multimedia content, comprising instructions being operable to cause data processing apparatus to:
   identify space in data storage of a video distribution server allocated to a subscriber;
   when space is available in the data storage allocated to the subscriber, transmit a request message to a queue management server that maintains a plurality of queues for individual subscribers of the video distribution server, each queue comprising location information for multimedia content selected or subscribed to at a remote content server by a subscriber, the request message requesting the location information for multimedia content next in the queue corresponding to the subscriber;
   wherein the queue comprises the location information for multimedia content having a size greater than the data storage allocated to the subscriber;
   receive a retrieval message providing the requested location information from the queue management server;
   retrieve the multimedia content from the remote content server using the location information received in the retrieval message; and
   store the retrieved multimedia content in the data storage allocated to the subscriber.

7. The computer program product of claim 6 comprising further instructions to:
   receive the retrieved multimedia content from the remote content server;
   transcode the retrieved multimedia content into a format suitable for display on a viewing device; and
   generate one or more trick files based on the transcoded multimedia content.

8. The computer program product of claim 6, wherein the queue comprises a plurality of queue entries arranged in an order, the computer program product comprising further instructions to:
   transmit a reorder message to the queue management server causing the queue management server to modify the order of the plurality of queue entries.

9. The computer program product of claim 6 comprising further instructions to:
   transmit the multimedia content from the data storage of the video distribution server to a viewing device associated with the subscriber for display.

10. The computer program product of claim 6 comprising further instructions to:
    receive an authentication token in the retrieval message from the queue management server; and
    transmit the authentication token to the remote content server enabling the retrieval of the multimedia content.

\* \* \* \* \*